United States Patent [19]

Wason

[11] 3,761,186

[45] Sept. 25, 1973

[54] APPARATUS FOR OPTICALLY INSPECTING THE CONDITION OF A SURFACE HAVING KNOWN VARIATIONS IN THE CONDITION

[75] Inventor: Thomas Dimock Wason, Raleigh, N.C.

[73] Assignee: International Telephone and Telegraph Corporation, New York, N.Y.

[22] Filed: Jan. 17, 1972

[21] Appl. No.: 218,099

Related U.S. Application Data

[63] Continuation of Ser. No. 869,612, Oct. 27, 1969, abandoned.

[52] U.S. Cl. ............................... 356/241, 356/168
[51] Int. Cl. ............................................ G01n 21/16
[58] Field of Search ................. 356/241, 237, 200, 356/168, 158, 71

[56] References Cited
UNITED STATES PATENTS

| | | | |
|---|---|---|---|
| 3,551,061 | 7/1967 | Glowa | 356/241 |
| 3,680,966 | 8/1972 | Cofek et al. | 356/241 |
| 3,546,377 | 12/1970 | Troll | 356/168 X |
| 3,515,488 | 6/1970 | Houser | 356/200 |

*Primary Examiner*—Ronald L. Wibert
*Assistant Examiner*—Paul K. Godwin
*Attorney*—James B. Raden

[57] ABSTRACT

A laser beam is used to selectively scan a surface under test, the characteristics of the surface determining the manner in which the scanning beam is reflected. A selected portion of the reflected beam is thereafter analyzed to indicate the condition of the surface.

16 Claims, 5 Drawing Figures

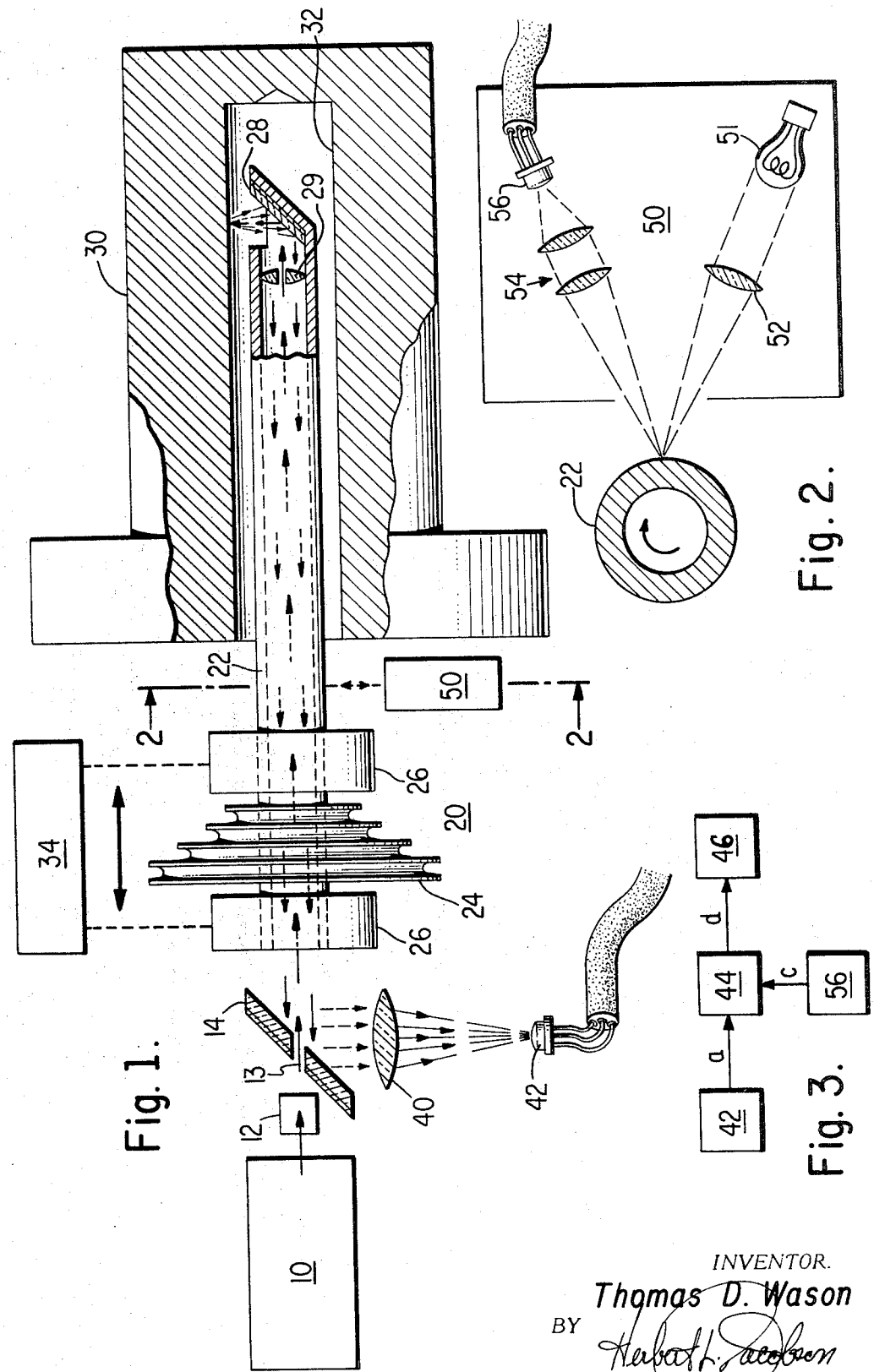

APPARATUS FOR OPTICALLY INSPECTING THE CONDITION OF A SURFACE HAVING KNOWN VARIATIONS IN THE CONDITION

This is a continuation of application Ser. No. 869,612 filed Oct. 27, 1969 now abandoned.

This invention relates to optical scanning inspection techniques.

In the manufacture of automotive subassemblies, such as engine blocks, brake cylinders, bearings, etc., it is important that the interior bored surfaces thereof be inspected for purposes of determining the presence of undesirable flaws or imperfections which may subsequently result in impairing their operation. However, due to their configurations, such subassemblies often do not readily lend themselves to microscopic inspection using standard techniques since the equipment normally required therefor usually cannot gain access to the cavity under inspection. Furthermore, in light of the high volume of parts produced, it is important that the inspection techniques implemented be quick, efficient and not rely on the subjective determination of an individual inspector. Ideally, it is desirable to utilize techniques which lend themselves to automation.

Accordingly, it is an object of the present invention to provide a means for optically inspecting the condition of a surface.

A further object of the present invention is to provide a means for optically inspecting the interior surface of a cylindrical bore, or like configuration, for purposes of detecting the existence of flaws thereon.

Apparatus for optically inspecting the condition of a surface, in accordance with the present invention, comprises: means for providing a collimated laser beam; means for scanning the surface under test with said laser beam, said beam being reflected by said scanned surface in accordance with the condition thereof; means for collecting that portion of said reflected beam which is confined to a predetermined region, said collected portion being indicative of the condition of the surface under inspection; and means for deriving an output signal from said collected beam.

In addition, apparatus in accordance with the present invention preferably includes means preprogrammed to disregard said collected beam where its characteristics are influenced by the existence of known surface conditions.

The present invention, along with additional objects and advantages thereof, will be more fully understood upon reading the specification which follows in light of the accompanying drawing wherein:

FIG. 1 illustrates an optical scanning device in accordance with one embodiment of the present invention;

FIG. 2 is a sectional view taken along section 2—2 of FIG. 1, illustrative of one embodiment of the aforementioned preprogrammed means used to disregard the optical signal where its characteristics are influenced by the existence of known surface conditions;

FIG. 3 illustrates one manner of integrating the preprogrammed means shown in FIG. 2 with the scanning apparatus of FIG. 1;

Figure 4:
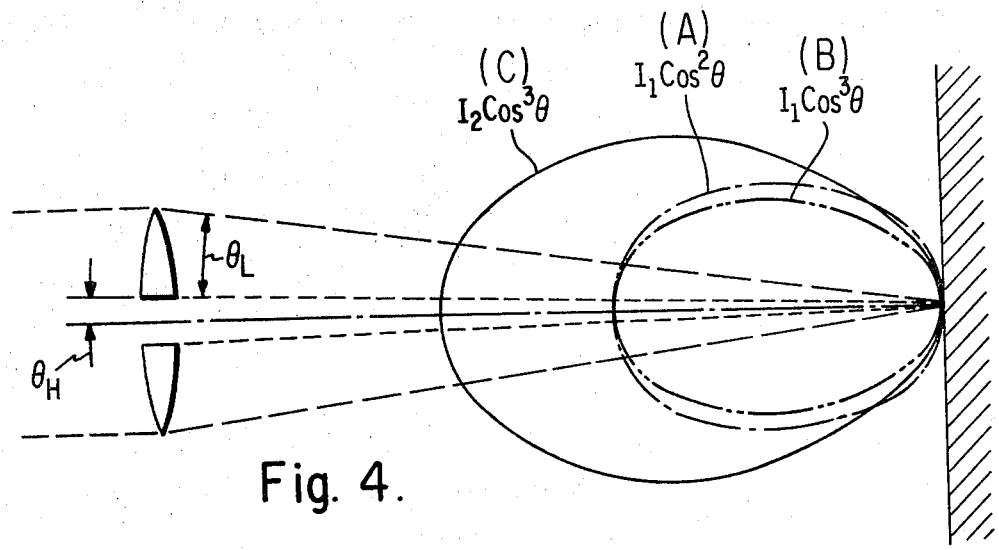
FIG. 4 illustrates the manner in which the scanning beam is reflected as a function of the characteristics of the surface under inspection.

Turning now to a description of FIG. 1, a source of laser energy 10 is provided, the output of which is directed through a subsystem 12 to provide a beam of laser light 13 exhibiting predetermined characteristics. The subsystem 12, for example, may be a beam expander or a reducing collimator. Should it be desirable to provide a laser beam having a uniformly distributed energy density across its diameter, a spacial filter such as described in U.S. Pat. No. 3,465,347 may be incorporated. The use of a subsystem has been found to be optional and dependent solely on the degree of resolution desired. In practice, a helium neon laser having a 1 milliwatt output at 6321 angstroms has been satisfactorily used in conjunction with a reducing collimator.

A drilled diagonal mirror 14 is disposed non-orthogonally in the path of laser beam 13, the diagonal mirror 14 being placed to permit the collimated beam 13 to pass directly through the hole therein.

A probe assembly 20 comprising a main tubular portion 22, a stepped pully block 24, and a pair of spindle bearings 26, is disposed coaxially with the collimated beam 13. The tubular portion 22 of the probe assembly 20 is adapted for insertion within the unit under test 30, and is formed with a hollow interior cavity such that the laser beam 13 can be projected along the longitudinal axis thereof. In the embodiment represented by FIG. 1, the unit under test 30 might be, for example, a master cylinder having an open-ended cylindrical bore 32.

The front end of the probe assembly 20 supports an angled mirror 28 whose reflective surface faces the hollow interior of the tubular probe. Alternatively, an internally reflecting prism may be used in place of the angled mirror 28, though the use of a prism may give rise to problems due to surface back-scatter. A drilled lens 29 is disposed in the path of the incoming laser beam 13 such that the beam initially passes through the hole in the lens 29 on course to the reflective surface of the mirror 28. Means (not shown) are provided for rotatably driving the probe assembly 20 at a desired speed. For example, a drive belt may be connected to one sheave of the pulley block 24. Alternatively, means other than a rotatably driven pulley block may be used to drive the probe assembly. For example, a directly driven air turbine may be used where high speed operation is desired.

As the probe assembly 20 is rotated within the unit under test 30, the laser beam 13 passing through the drilled lens 29 is reflected off the surface of the angled mirror 28 continuously scanning the interior surface of the cavity under test.

In practice, the bore surface behaves as a screen, serving to diffuse and scatter the light impinging thereon. The intensity of the reflected light is expressed by Lamberts' +equation:

$$I = I_o \cos{}^x\theta$$

where:
  $I$ is the maximum intensity of the reflected light;
  $I_o$ is the intensity of the reflected normal component;
  $\theta$ is the angle between any component and the normal; and
  $X$ is indicative of the optical characteristics of the reflecting surface.

As the laser beam is scanned about the surface under test, it will be reflected in accordance with the optical characteristics thereof which themselves are representative of the physical condition of the surface. FIG. 4 illustrates the shape of the reflected energy distributions for surfaces of like absorption characteristics exhibiting $X$ values of 2 and 3 (i.e., curves A & B). It will be seen that for values of $\theta = 0$, (i.e., $\cos^x \theta = 1$ $I_o$ is a function of the absorption characteristics of the surface. Furthermore, it will be seen that generally the distribution of the reflected energy is a function of both the absorption and $X$ characteristics of the surface. Hence, with regard to the lens system depicted in FIG. 4, the illumination of the lens 29 can be mathematically expressed as $$\text{Illum.} = \int_{\theta_H}^{\theta_L} I_0 \cos x_\theta d\theta$$

and that for two surfaces having the same absorption characteristics and different degrees of optical roughness, (i.e., different $X$ characteristics) the one with the smoother surface (i.e., the $B$ curve representing the higher $X$ characteristic) reflects more light to the lens 29. Moreover, a surface flaw tends to exhibit both a lower $X$ value and a lower degree of absorption. Accordingly, the A and C distributions shown in FIG. 4 are most representative of reflections from a surface with (A) and without (C) a flaw.

In the configuration of FIG. 1, the reflected beam is directed onto lens 29 by the angled mirror 28. The lens 29 serves to collect that portion of the reflected beam which impinges thereon, the collected portion being indicative of the condition of the surface under inspection. Thereafter, the collected portion is projected down the length of the probe 22 so that it is reflected via the non-orthogonally disposed mirror 14 onto a photodetector 42 via lens 40. The photodetector 42 serves to transform the light focused thereon into an output signal which is then fed to an analysis circuit (not shown).

The characteristics of the output signal may be described as an AC signal which varies as a function of the quality of the surface under inspection, at a DC level. The signal may be fed to an oscilloscope and transformed into a visual analogue on the display tube thereof. A sample output, as might be seen at the output of photodetector 42, is depicted by curve $a$ of FIG. 5, where the peak-to-peak amplitude of the AC signal is indicative of the quality of the surface under inspection. In the event of a flaw 62, the amount of light upon photodetector 42 decreases, causing a dip in the output signal.

In many instances the surface of the unit under test may be formed in a manner which would indicate that a flaw exists when in reality the indicated flaw is intended. For example, the surface may be formed with small screw holes or with protruding portions such as are occasioned by chaplet wires. In such event it becomes difficult for the inspecting operator or processing electronics, as the case may be, to distinguish between intended and non-intended flaws. To obviate the probability of error, a gating circuit 50, as illustrated in cross section in FIG. 2, may be incorporated into the inspection apparatus.

Basically, the gating circuit 50 may comprise a focused light source 51 which is reflected from a preprogrammed reference surface onto a photodetector 56. The photodetector 56 is thereafter coupled to the analysis circuit mentioned supra, via a gate 44 as shown in FIG. 3, such that in the absence of an output from the photodetector 56 the analysis circuit 46 will not operate.

In FIG. 2, the light source 51 is focused via a lens 52 onto the sleeve of the tubular portion 22 shown in cross section of the probe assembly 20. The sleeve is strategically marked along its length (i.e., programmed) with a light absorbing material at points which correspond to the presence of known flaws. In the absence of a mark on the rotating probe sleeve 22, the light 53 from the light source 50 will be focused via lens 52 on the rotating probe sleeve 22 and reflected therefrom via lens system 54 onto photodetector 56; the output signal from photodetector 56 serving as a "go" signal for the analysis circuit 46 shown in FIG. 3. Where the probe 22 is marked with a light absorbing material, indicative of the existence of a known flaw, the light output of light source 51 will be absorbed thereby, and no light reflected to photodetector 56. Consequently the analysis circuit 46 will be prevented from operating or "gated." This programmed predictability of intended surface irregularities permits the generated output signal to be electronically processed, disregarding the "gated" spots, and obviates the need for human intervention, thereby making the system particularly adaptable for automated production line techniques. By properly preprogramming the sleeve, the gating circuit can be adapted to disregard intended flaws regardless of their configuration.

Figure 5:
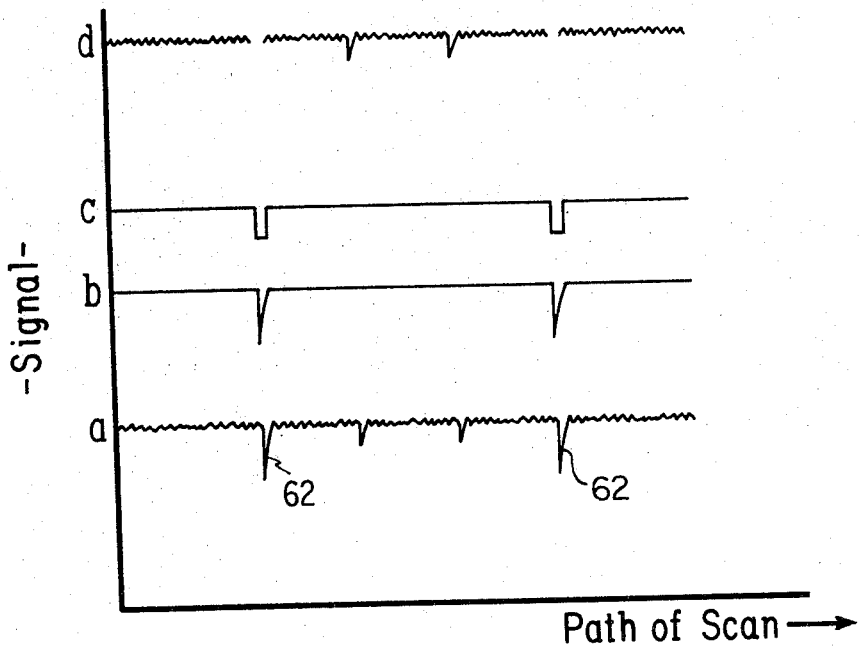
FIG. 5 represents wave forms as they appear at the points indicated in FIG. 3.

Curve $b$ of FIG. 5 depicts those flaws, within the output signal generated from photodetector 42 (i.e., curve $a$) which are intended. Curve $c$ depicts the output from photodetector 56 which is thereafter fed to the gate 44 of FIG. 3. Curve $d$ illustrates the final output signal transmitted to the analysis circuit 46 with the dips 62 indicated due to intended flaws gated out.

In operation the unit under test 30 may be maintained stationary and the tubular portion 20 of the probe 22 inserted therein and withdrawn therefrom via means 34 mechanically coupled thereto. Alternatively, in some instances it may be desirable to maintain the rotating probe "in situ" and advance the unit under test 30 about the tubular portion 22 thereof.

I claim:

1. Apparatus for inspecting the condition of a surface having known irregularities thereon, comprising:

scanning means for optically scanning a surface under test in accordance with a given program, said scanning means being responsive to variations in the condition of said surface from a given condition, said scanning means generating condition variation signals in response to both known and unknown irregularities, means coupled to said scanning means and preprogrammed to follow said given program and to disregard said known irregularities whereby only signals for unknown irregularities are provided as output signals, the surface to be inspected comprising a cylindrical bore, said scanning means including a probe rotatably and axially moveable in a given order with respect to said bore, said preprogrammed means including means synchronized with said scanning means and means simulating said known condition for generating in time coincidence with said known irregularities error cancelling signals for cancelling erroneous condition variation signals, and said error cancelling signals causing said scanning means to disregard said known irregularities.

2. The apparatus of claim 1 wherein said preprogrammed means includes means secured to said probe external to said bore during the scanning of said bore, said secured means having a given position external said bore when said scanning means responds to said known irregularities, and said preprogrammed means further includes means located at said given position responsive to said secured means for generating said error cancelling signals.

3. The apparatus of claim 1 wherein said secured means includes light absorbing material located on said probe at discrete locations, each discrete location corresponding to a separate different one of said irregularities, said probe being light reflective, and said means located at said given position includes light generating means for causing a light beam to impinge upon said probe at said given position, and means responsive to the light reflected from said probe at said given position to generate an error cancelling signal whenever said light absorbing material is located in said given position.

4. Apparatus for inspecting the condition of a surface having known irregularities thereon, comprising:

means for scanning the surface under test with a beam of light in a given sequence, said scanning means being responsive to variations in the condition of said surface from a given condition, said scanning means generating erroneous condition variation signals in response to said known irregularities, said surface to be inspected including a cylindrical bore, preprogrammed means, including means simulating a known condition, coupled to said scanning means programmed to generate error cancelling signals for causing said scanning means to disregard said erroneous condition variation signals, an error cancelling signal being generated for each of said irregularities whereby said erroneous signals are cancelled.

5. The apparatus of claim 4 wherein said scanning means includes means for causing said beam of light to continuously scan said surface, said known irregularities occurring in a given order during said sequence.

6. The apparatus of claim 5 wherein the surface to be inspected is a cylindrical bore, said scanning means including an elongated cylindrical probe rotatably and axially moveable with respect to said bore, and said preprogrammed means includes a pattern of substantially identical irregularities secured externally to said probe, arranged in substantially the same pattern as the known irregularities on said surface, each of said identical irregularities corresponding to a different one of said known irregularities and being located in a given position external the bore when said light beam impinges upon the corresponding known irregularity.

7. An apparatus for inspecting the condition of an interior surface of a hollow article, said surface having known irregularities thereon, comprising:

means for directing a narrow beam of radiant energy in a given sequence over said surface and sensitive to the response of said surface to said beam of energy, said means providing a first signal when said surface varies from a given condition, said first signal including an erroneous condition variation signal when the surface variations include said known irregularities, said known irregularities occurring in a given order during said sequence, means coupled to said beam directing means preprogrammed to provide a second signal whenever said beam of energy impinges upon any of said known irregularities, said preprogrammed means including light sensitive means secured to said beam directing means in said given order, light generating means secured to radiate a beam of light on said light sensitive means only when said beam of energy impinges upon said known irregularities, transducer means responsive to light impinging upon said light sensitive means for generating said second signal whenever said beam of energy impinges upon said known irregularities, and means responsive to said first and second signals for providing a surface variation signal only when said first signal is generated in the absence of said second signal whereby said erroneous condition variation signal is disregarded.

8. Apparatus for inspecting the condition of a surface having known irregularities thereon, comprising:

means for optically scanning a surface under test in accordance with a given program, said scanning means being responsive to variations in the condition of said surface from a given condition, said scanning means generating condition variation signals in response to irregularities including erroneous condition variation signals in response to said known irregularities, means including a separate light source and light sensing means for optically scanning a record of known irregularities and generating blanking signals synchronized with said erroneous condition variation signals, and gating means coupled to receive said erroneous signals and said blanking signals and to provide output signals incorporating said condition variation signals free of erroneous condition variation signals.

9. Apparatus for inspecting the condition of a surface having known irregularities thereon, comprising:

means for optically scanning the surface under test in accordance with a given program, said scanning means being responsive to variations in the condition of said surface from a given condition, said scanning means generating erroneous condition variation signals in response to said known irregularities, means coupled to said scanning means and preprogrammed to follow said given program for causing said scanning means to disregard said known irregularities whereby only said erroneous signals are eliminated, said surface to be inspected consisting of a cylindrical bore, said scanning means including a probe rotatably and axially moveable with respect to said bore, and said preprogrammed means including means simulating said known condition for generating in time coincidence with said known irregularities error cancelling signals for cancelling said erroneous condition variation signals, said error cancelling signals causing said scanning means to disregard said known irregularities.

10. The apparatus of claim 9 wherein said scanning means includes means for longitudinally and transversely scanning said surface in a given order, and
said preprogrammed means includes means synchronized with said scanning means.

11. The apparatus of claim 9 wherein said preprogrammed means includes means secured to said probe external said bore during the scanning of said bore, said secured means having a given position external said bore when said scanning means responds to said known irregularities, and
said preprogrammed means further includes means located at said given position responsive to said secured means for generating said error cancelling signals.

12. The apparatus of claim 9 wherein said secured means includes light absorbing material located on said probe at discrete locations, each discrete location corresponding to a separate different one of said irregularities, said probe being light reflective, and
said means located at said given position includes light generating means for causing a light beam to impinge upon said probe at said given position, and means responsive to the light reflected from said probe at said given position to generate an error cancelling signal whenever said light absorbing material is located in said given position.

13. Apparatus for inspecting the condition of a surface having known irregularities thereon, comprising:
means for scanning the surface under test with a beam of light in a given sequence, said scanning means being responsive to variations in the condition of said surface from a given condition, said scanning means generating erroneous condition variation signals in response to said known irregularities,
preprogrammed means coupled to said scanning means programmed to generate error cancelling signals for causing said scanning means to disregard said erroneous condition variation signals, an error cancelling signal being generated for each of selected ones of said irregularities whereby only said selected ones of said erroneous signals are cancelled,
said scanning means including means for causing said beam of light to continuously scan said surface, said known irregularities occurring in a given order during said sequence,
the surface to be inspected including a cylindrical bore, said scanning means including an elongated cylindrical probe rotatably and axially moveable with respect to said bore, and
said preprogrammed means including a pattern of substantially identical irregularities secured externally to said probe, arranged in substantially the same pattern as the known irregularities on said surface, each of said identical irregularities corresponding to a different one of said known irregularities and being located in a given position external the bore when said light beam impinges upon the corresponding known irregularity.

14. Apparatus for inspecting the condition of a surface having known irregularities thereon, comprising:
scanning means for optically scanning the surface under test in accordance with a given program, said scanning means being responsive to variations in the condition of said surface from a given condition, said scanning means generating condition variation signals in response to both known and unknown irregularities,
means coupled to said scanning means and preprogrammed to follow said given program and to disregard said known irregularities whereby only signals for unknown irregularities are provided as output signals,
said surface to be inspected including a cylindrical bore, said scanning means including a probe rotatably and axially moveable with respect to said bore,
said preprogrammed means including means simulating said known condition for generating in time coincidence with said known irregularities error cancelling signals for cancelling erroneous condition variation signals,
said error cancelling signals causing said scanning means to disregard said known irregularities,
said preprogrammed means including means secured to said probe external to said bore during the scanning of said bore, said secured means having a given position external said bore when said scanning means responds to said known irregularities, and
said preprogrammed means further including means located at said given position responsive to said secured means for generating said error cancelling signals.

15. The apparatus of claim 14 wherein said secured means includes light absorbing material located on said probe at discrete locations, each discrete location corresponding to a different one of said irregularities, said probe being light reflective, and
said means located at said given position includes light generating means for causing a light beam to impinge upon said probe at said given position, and means responsive to the light reflected from said probe at said given position to generate an error cancelling signal whenever said light absorbing material is located in said given position.

16. Apparatus for inspecting the condition of a surface having known irregularities thereon, comprising:
means for scanning the surface under test with a beam of light in a given sequence, said scanning means being responsive to variations in the condition of said surface from a given condition, said scanning means generating erroneous condition variation signals in response to said known irregularities,
preprogrammed means coupled to said scanning means programmed to generate error cancelling signals for causing said scanning means to disregard said erroneous condition variation signals, an error cancelling signal being generated for each of said irregularities whereby said erroneous signals are cancelled,
said scanning means including means for causing said beam of light to continuously scan said surface, said known irregularities occurring in a given order during said sequence,
said surface to be inspected being formed as a cylindrical bore, said scanning means including an elongated cylindrical probe rotatably and axially moveable with respect to said bore, and
said preprogrammed means including a pattern of substantially identical irregularities secured externally to said probe, arranged in substantially the same pattern as the known irregularities on said surface, each of said identical irregularities corresponding to a different one of said known irregularities and being located in a given position external the bore when said light beam impinges upon the corresponding known irregularity.

* * * * *